US008284421B2

(12) United States Patent
Lee

(10) Patent No.: US 8,284,421 B2
(45) Date of Patent: Oct. 9, 2012

(54) PRINTING CLIENT MANAGEMENT METHOD AND WIRELESS LAN PRINTER IN WIRELESS NETWORK

(75) Inventor: Hyuck-Jae Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1927 days.

(21) Appl. No.: 10/681,178

(22) Filed: Oct. 9, 2003

(65) Prior Publication Data

US 2004/0141487 A1 Jul. 22, 2004

(30) Foreign Application Priority Data

Jan. 22, 2003 (KR) .................. 10-2003-0004254

(51) Int. Cl.
| G06F 3/12 | (2006.01) |
| G06F 15/16 | (2006.01) |
| G06F 15/173 | (2006.01) |
| G06K 15/00 | (2006.01) |
| H04L 12/26 | (2006.01) |
| H04L 12/28 | (2006.01) |
| H04L 12/413 | (2006.01) |
| H04B 7/216 | (2006.01) |
| H04B 3/36 | (2006.01) |
| H04W 4/00 | (2009.01) |

(52) U.S. Cl. ....... 358/1.15; 358/1.16; 358/1.1; 370/338; 370/332; 370/230.1; 370/445; 370/351; 455/7; 709/238; 709/208

(58) Field of Classification Search ................. None
See application file for complete search history.

(56) References Cited

U.S. PATENT DOCUMENTS

| 5,696,894 | A | * | 12/1997 | Ono ............................. 358/1.15 |
| 6,003,069 | A | | 12/1999 | Cavill |
| 6,167,514 | A | * | 12/2000 | Matsui et al. ................. 713/150 |
| 6,192,400 | B1 | * | 2/2001 | Hanson et al. ................ 709/217 |
| 6,738,841 | B1 | * | 5/2004 | Wolff ............................. 710/62 |
| 6,829,288 | B2 | * | 12/2004 | Orava ........................... 375/132 |
| 6,891,820 | B1 | * | 5/2005 | Pham et al. ................... 370/338 |
| 6,980,319 | B2 | * | 12/2005 | Ohta ............................. 358/1.18 |
| 6,993,358 | B2 | * | 1/2006 | Shiotsu et al. ............. 455/552.1 |
| 6,993,562 | B2 | * | 1/2006 | Treptow et al. ............... 709/206 |

(Continued)

FOREIGN PATENT DOCUMENTS

EP 1 271 889 1/2003

(Continued)

OTHER PUBLICATIONS

Korean Office Action for corresponding Korean Appln. No. 10-2003-0004254, dated Feb. 28, 2005.

(Continued)

*Primary Examiner* — Hilina S Kassa
(74) *Attorney, Agent, or Firm* — Staas & Halsey LLP

(57) ABSTRACT

A printing client management method and a wireless LAN printer in a wireless network is provided. According to the printing client management method for a wireless Local Area Network (LAN), information is extracted from Media Access Control (MAC) frames of the printing clients that associate with a Basic Service Set (BSS) including the wireless LAN printer. A list of the printing clients is formed using MAC addresses of the MAC frames as indexes, and management of printing operations of the printing clients is completed according to the list.

33 Claims, 3 Drawing Sheets

U.S. PATENT DOCUMENTS

| | | | |
|---|---|---|---|
| 7,016,062 B2 * | 3/2006 | Ishizuka | 358/1.15 |
| 7,058,719 B2 * | 6/2006 | Motoyama | 709/228 |
| 7,089,321 B2 * | 8/2006 | Hayashi | 709/237 |
| 7,130,904 B2 * | 10/2006 | Kitchin | 709/225 |
| 7,136,914 B2 * | 11/2006 | Motoyama | 709/223 |
| 7,170,857 B2 * | 1/2007 | Stephens et al. | 370/230 |
| 7,212,513 B2 * | 5/2007 | Gassho et al. | 370/338 |
| 7,269,419 B2 * | 9/2007 | Kim | 455/434 |
| 7,284,061 B2 * | 10/2007 | Matsubayashi et al. | 709/229 |
| 7,315,886 B1 * | 1/2008 | Meenan et al. | 709/219 |
| 7,317,712 B2 * | 1/2008 | Ishimura | 370/338 |
| 7,325,031 B2 * | 1/2008 | Ohara | 709/203 |
| 7,339,912 B2 * | 3/2008 | Oak | 370/338 |
| 7,362,722 B2 * | 4/2008 | Otsuka | 370/328 |
| 7,376,091 B1 * | 5/2008 | Eccles et al. | 370/265 |
| 7,403,512 B2 * | 7/2008 | Tsai et al. | 370/338 |
| 7,454,796 B2 * | 11/2008 | Mazzagatte et al. | 726/28 |
| 7,672,278 B2 * | 3/2010 | Gassho et al. | 370/338 |
| 2001/0029531 A1 | 10/2001 | Ohta | |
| 2002/0065873 A1 * | 5/2002 | Ishizuka | 709/203 |
| 2002/0123345 A1 * | 9/2002 | Mahany et al. | 455/432 |
| 2002/0140963 A1 * | 10/2002 | Otsuka | 358/1.14 |
| 2003/0002072 A1 * | 1/2003 | Berkema et al. | 358/1.15 |
| 2003/0002073 A1 * | 1/2003 | Berkema et al. | 358/1.15 |
| 2003/0014368 A1 * | 1/2003 | Leurig et al. | 705/64 |
| 2003/0090701 A1 * | 5/2003 | Crane et al. | 358/1.15 |
| 2003/0091015 A1 * | 5/2003 | Gassho et al. | 370/338 |
| 2003/0156567 A1 * | 8/2003 | Oak | 370/338 |
| 2003/0210420 A1 * | 11/2003 | Yamauchi | 358/1.14 |
| 2003/0236064 A1 * | 12/2003 | Shiohara et al. | 455/1 |

FOREIGN PATENT DOCUMENTS

| | | |
|---|---|---|
| EP | 1271889 A2 * | 1/2003 |
| JP | 10-091375 | 4/1998 |
| JP | 10091375 A * | 4/1998 |
| JP | 2001-251336 | 9/2001 |
| JP | 2002-278711 | 9/2002 |
| WO | 01/47168 | 6/2001 |

OTHER PUBLICATIONS

Office Action for corresponding Chinese Appln. No. 2001-10002868.1 dated May 13, 2005.

European Office Action issued Sep. 26, 2007 in corresponding European Patent Application No. 04250346.6-1525.

* cited by examiner

PRINTING CLIENT MANAGEMENT METHOD AND WIRELESS LAN PRINTER IN WIRELESS NETWORK

CROSS-REFERENCE TO RELATED APPLICATIONS

This application claims the priority of Korean Patent Application No. 2003-4254, filed on Jan. 22, 2003, in the Korean Intellectual Property Office, the disclosure of which is incorporated herein in its entirety by reference.

BACKGROUND OF THE INVENTION

1. Field of the Invention

The present invention relates to a printing client management method and a wireless Local Area Network (LAN) printer in a wireless network, and more particularly, to a printing client management method and a wireless LAN printer using Media Access Control (MAC) addresses as an index based on the IEEE 802.11b standard.

2. Description of the Related Art

Currently, printing operations are generally performed using a wired LAN. A client/server printer driver system that utilizes such a wired LAN is disclosed in U.S. Pat. No. 6,003,069.

However, alteration and extension of performance of the network and the system in the wired LAN is difficult due to the characteristics of a wired network. In addition, alternation and extension of the network and the system of the wired LAN require large investment, and wired LANs are not able to support a mobile communications system.

Thus, demand for wireless LANs to expand the performance of or replace wired LANs has increased. Here, a wireless LAN is characterized as having the ability to transfer and receive data through air, using radio frequency (RF), or infrared rays. Wireless LANs have the advantages of easy installation, and rapid network deployment. In addition, a wireless LAN does not require interconnecting wires, thus, allows flexible installation and movement of terminals, enabling simple maintenance and repair of the wireless LAN. These advantages have brought increasing attention towards the use of wireless LANs.

The Institute of Electrical and Electronics Engineers (IEEE) established the IEEE 802.11 wireless standard to describe an over the air interface between a wireless client, a base station or access point, and other wireless clients. The IEEE 802.11b standard, established in September 1999, provides a maximum speed of 11 Mbps in the 2.4 GHz band.

The IEEE 802.11b standard has been applied in the development of wireless LAN printers. When a computer is network enabled within the IEEE 802.11b standard to perform a printing operation using an IEEE 802.11b wireless LAN printer, the computer should associate with a Basic Service Set (BSS). While included as a BSS printing client, similar to other stations connected within the IEEE 802.11b such as a computer, an IEEE 802.11b wireless LAN printer performs various processes in order to exchange upper protocol packets including scanning, synchronization, association, disassociation, authentication, de-authentication, and transfer.

The wireless LAN printer functions as a network server. If the wireless LAN printer is included in the BSS, printing clients that wish to associate with the BSS perform synchronization, association, and authentication processes in relation to the wireless LAN printer. However, association with the wireless LAN printer is limited to approximately ten printing clients.

On the other hand, printing clients that have not been authenticated to receive services of the wireless LAN printer are able to associate with the wireless LAN printer. In such cases, because the number of printing clients allowed to associate with the wireless LAN printer is limited, the printing clients that have been authenticated to receive services of the wireless LAN printer are unable to associate with the wireless LAN printer. In other words, authenticated printing clients are unable to associate with the wireless LAN printer or perform the printing operation due to the presence of non-authenticated printing clients.

SUMMARY OF THE INVENTION

An aspect of the present invention provides a printing client management method to associate authenticated printing clients with a wireless Local Area Network (LAN) printer by forming a list of printing clients using media access control (MAC) addresses as an index.

Another aspect of the present invention provides a wireless LAN printer to associate authenticated printing clients with a wireless LAN printer by forming a list of printing clients using MAC addresses as an index.

Additional aspects and advantages of the invention will be set forth in part in the description which follows and, in part, will be obvious from the description, or may be learned by practice of the invention.

Accordingly, there is provided a printing client management method of a wireless Local Area Network (LAN) printer, which functions as a network server and manages at least one printing client in a LAN. The method comprises: extracting information from Media Access Control (MAC) frames of printing clients that associate with a Basic Service Set (BSS) that includes the wireless LAN printer; forming a list of the printing clients by using MAC addresses of the MAC frames as indexes; and managing printing operations of the printing clients according to the list.

According to yet another aspect of the present invention, there is provided a wireless LAN printer, which functions as a network server and manages printing client in a LAN. The wireless LAN printer comprises: an extraction unit, which extracts information from MAC frames of printing clients that associate with a BSS that includes the wireless LAN printer a list forming unit, which forms a list of the printing clients by using MAC addresses of the MAC frames as indexes; and a management unit, which manages printing operations of the printing clients according to the list.

According to one aspect, both the wireless LAN printer and the printing clients operate within the IEEE 802.11b standard.

According to another aspect, the list of printing clients formed using MAC addresses as an index is restructured in real time according to a beacon signal, and the list is updated when states of the printing clients change.

Further, according to another aspect, the list of printing clients denotes the states of the printing clients in relation to the wireless LAN printer including fields for at least one of synchronization, association, and authentication.

According to another aspect, the list of printing clients includes fields specifying whether each printing client is allowed to associate with the wireless LAN printer.

According to another aspect, the list of printing clients includes fields assigning a printing priority to the printing clients.

According to yet another aspect, the list of printing clients includes fields denoting whether specific functions of the wireless LAN printer can be used by a printing client.

Another aspect of the invention comprises a Personal Computer, a Personal Digital Assistant, or a cellular phone that includes a wireless LAN functionality as a printing client.

According to another aspect, the extraction unit, the list forming unit, and the management unit are implemented in network cards of the wireless LAN printer. While according to another aspect, the units are implemented as hardware or software.

BRIEF DESCRIPTION OF THE DRAWINGS

The above and/or other aspects and advantages of the invention will become apparent, and more readily appreciated from the following description of the preferred embodiment, taken in conjunction with accompanying drawings of which.

DETAILED DESCRIPTION OF THE PREFERRED EMBODIMENTS

Figure 1:
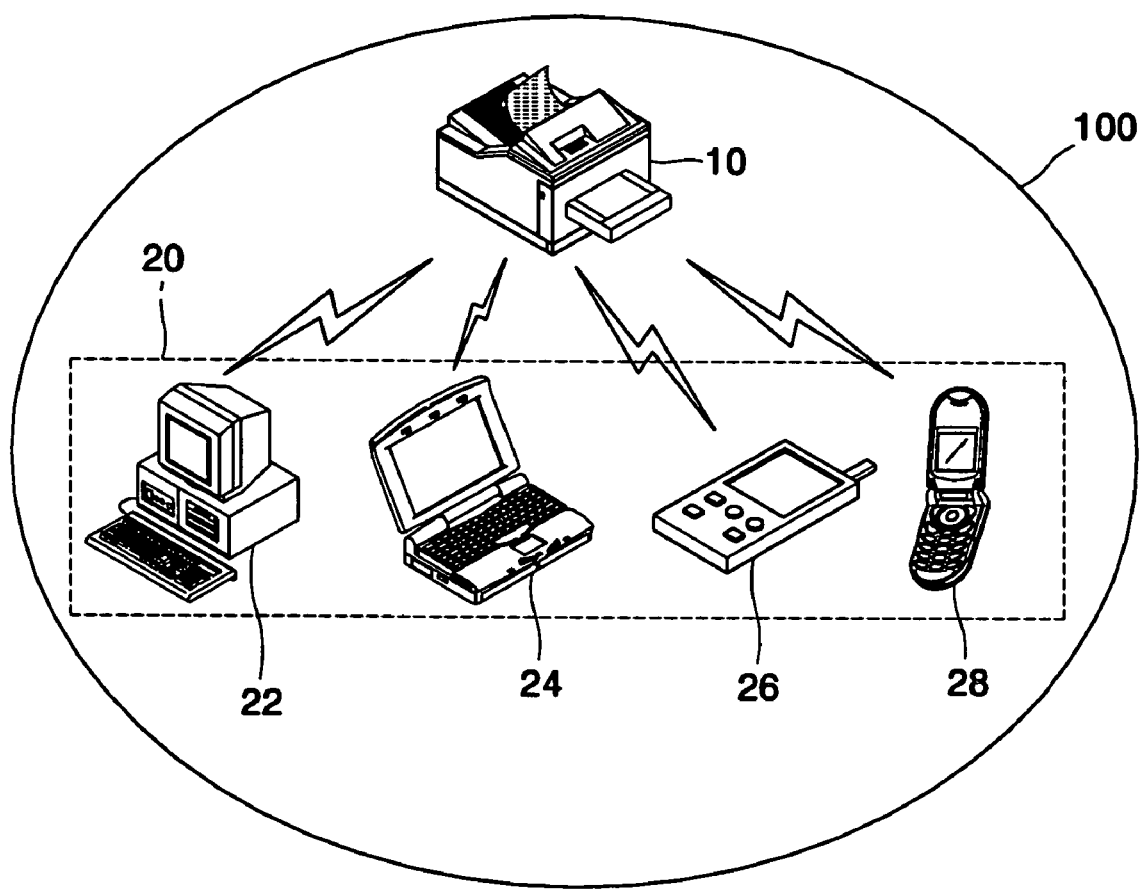
FIG. 1 is a view to illustrate a wireless local area network (LAN) group that includes a wireless LAN printer.

Reference will now be made in detail to the present preferred embodiments of the present invention, examples of which are illustrated in the accompanying drawings, wherein like reference numerals refer to the like elements throughout.

In describing different aspects of the present invention, the detailed descriptions of a conventional technique will be omitted when it is determined that the detailed descriptions deviate from the present invention. In addition, the terms used in the description are defined consistent with the functions of elements in the present invention. Thus, the terms may be different depending on the intentions and usages of users and operators. Thus, the terms will be defined based on the description of the present invention.

A wireless Local Area Network (LAN) group that includes a wireless LAN printer is shown in FIG. 1.

Referring to FIG. 1, a wireless LAN printer 10 and printing clients 20 communicate in a wireless LAN based on the IEEE 802.11b standard. Here, the wireless LAN printer 10 functions as a network server. The printing clients 20 include a Personal Computer (PC) 22, a laptop computer 24, a Personal Digital Assistant (PDA) 26, and a cellular phone 28. The printing clients depicted in FIG. 1 are only illustrative of the various printing clients that may be comprised in a wireless LAN, and a given wireless LAN may include more or less of the printing clients shown in FIG. 1. These and other similar printing clients 20 perform printing operations using the wireless LAN printer 10.

Figure 2:
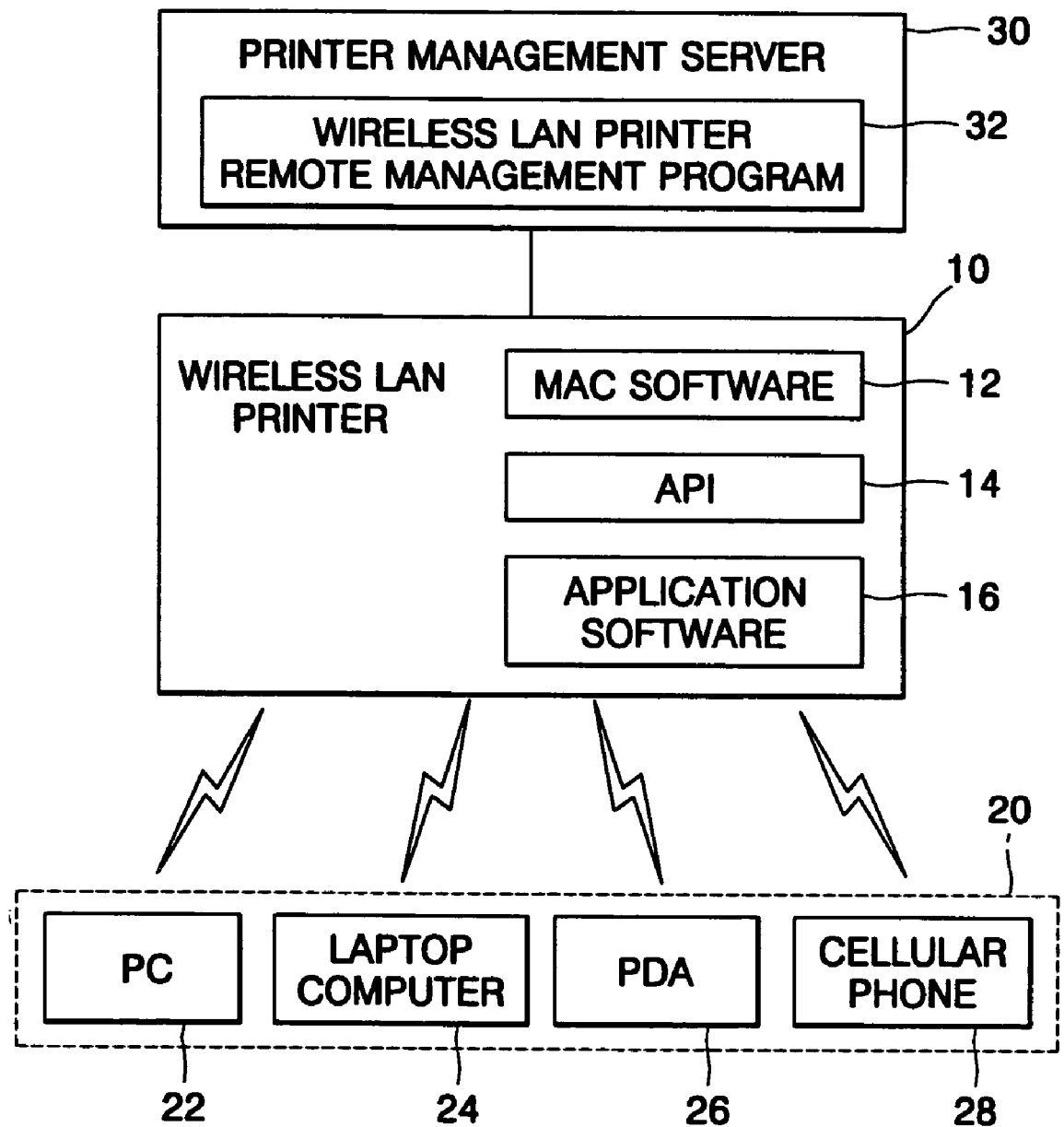
FIG. 2 is a block diagram to illustrate a wireless LAN group that includes a wireless LAN printer according to an aspect of the present invention.

A block diagram to illustrate a wireless LAN group that includes a wireless LAN printer according to an aspect of the present invention is shown in FIG. 2.

The wireless LAN printer 10, according to one aspect of the present invention includes: a Media Access Control (MAC) software 12, an Application Programming Interface (API) 14, and an application software 16. Here, the MAC software 12 is used to extract information from the MAC frames of the printing clients 20. The API 14 forms a list of printing clients 20 using each of the MAC addresses associated with the MAC frames as an index. The list of printing clients is used to manage the printing operations of the printing clients 20. The application software 16 is used to perform the printing operations.

The wireless LAN printer 10 maintains a wired or wireless connection to a printer management server 30. The printer management server 30 includes a wireless LAN printer remote management program 32.

Figure 3:
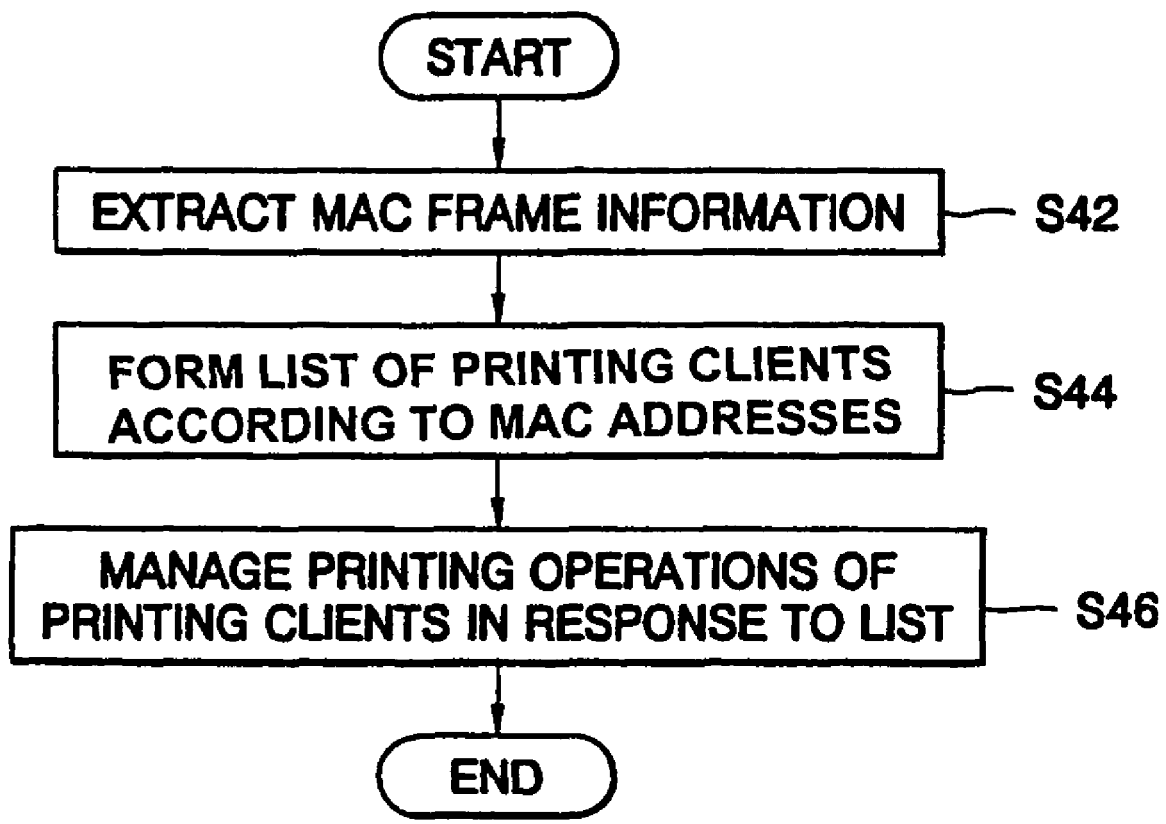
FIG. 3 is a flow chart to illustrate a printing client management method according to another aspect of the present invention.

A flowchart to illustrate a printing client management method according to one aspect of the present invention is shown in FIG. 3.

Referring to FIG. 3, information on the MAC frames of the printing clients 20 is extracted in operation S42 via the wireless LAN printer 10, which functions as a network server that manages multiple printing clients 20 in a wireless LAN. Thereafter, the list of the printing clients 20 are formed using each MAC address as an index, in operation S44. Next, in response to the list, the printing operations of the printing clients 20 are managed in operation S46.

In order to allow the printing clients 20 to use the wireless LAN printer 10 in a wireless LAN, the wireless LAN printer 10 and the printing clients 20 should be associated with one BSS 100. The BSS 100 is referred to as a wireless LAN group or a link level group and defines a limited space where wireless service can be provided. In other words, the BSS 100 is a basic network structure in the wireless LAN, or a cell, that is formed of one access point (AP) and at least one terminal.

While included in the BSS 100, the printing clients 20 perform various processes including scanning, synchronization, association, authentication, transfer, de-authentication, and disassociation in order to exchange upper protocol packets.

The wireless LAN printer 10, according to an aspect of the present invention, functions as a network server. In other words, the wireless LAN printer 10 becomes a BSS master or a link group server. The BSS master is a group owner that generates beacons. In a situation where the wireless LAN printer 10 is included in the BSS 100, the printing clients 20 that wish to associate with the BSS 100 perform processes such as, synchronization, association, and authentication with respect to the wireless LAN printer 10. However, association with the wireless LAN printer 10 is limited to approximately ten printing clients 20. Thus, it is preferable that only authenticated printing clients 20 be allowed to associate with the BSS 100.

To this end, information is extracted from the MAC frames of the printing clients 20. Thereafter, a list of the printing clients 20 is formed using each of the MAC addresses corresponding to the MAC frames as an index. Next, using the list, the printing operations of the printing clients 20 are managed. Since each of the LAN cards has a unique MAC address, each printing client 20 is distinguished by its respective MAC address.

The hierarchy of the MAC frames is present in the sublayer of the data link layer, which is the second layer of the seven layers of the Open Systems Interconnection (OSI) basic reference model. The MAC frames define the transmitting/receiving method of the frames, the format of the frames, and error detection of data. According to the IEEE 802.11b standard, the MAC frames are referred to as link level frames. The link level frames include three frames, management frames, control frames, and data frames.

The list is restructured in real time according to each of the beacon signals, and the list is updated when the states of the printing clients 20 change. In addition, the list reflects the states of the printing clients 20 in relation to the wireless LAN printer 10 and includes fields regarding synchronization, association, and authentication.

Furthermore, the list of printing clients includes fields specifying whether each printing client 20 is allowed to associate with the wireless LAN printer 10. The wireless LAN printer remote management program 32 in the printer management server 30 updates the fields specifying association permission. In other words, the wireless LAN printer remote management program 32 enables the fields denoting association permission in relation to authenticated printing clients, and disables the fields in relation to non-authenticated printing clients. Allowance of the association of the printing clients 20 with respect to the wireless LAN printer 10 is determined based on the fields denoting association permission. In the conventional system, when the non-authenticated printing clients associate with the wireless LAN printer 10, it is impossible for the authenticated printing clients to associate with the wireless LAN printer 10. However, since the fields denoting association permission are included in the system according to one aspect of the present invention and the system prevents non-authenticated printing clients form associating with the wireless LAN printer 10, the authenticated printing clients are able to receive services from the wireless LAN printer 10.

In addition, the list of printing clients includes fields denoting the printing priority of the printing clients 20. Thus, those printing clients higher in the printing priority are granted access to the printing service prior to those printing clients lower in the printing priority.

Furthermore, the list includes fields specifying whether various functions of the wireless LAN printer 10 are accessible to each of the printing clients 20. For example, when the wireless LAN printer 10 is a high-end printer that includes various functions, such as color printing, photo printing, and mono printing, the list of printing clients includes the fields that specify whether a particular function is accessible to each of the printing clients 20. Thus, each field is enabled or disabled according to the functions desired by a user, and the change can be requested based on the functions desired by the user.

The list of printing clients is managed in real time and reflects the state of the wireless LAN printer 10. In the case where a plurality of wireless LAN printers of the same kind are present, the wireless LAN printer remote management program 32 monitors the number of clients and the traffic of the clients in each group, in relation to each of the wireless LAN printers 10. The wireless LAN printer remote management program 32 can rearrange associations so that a wireless LAN printer 10 having less traffic is associated with additional clients.

It is possible to construct a business model for a printing service provider by using a printing client management method and a wireless LAN printer according to as aspect of the present invention. For example, a printer manager can form a BSS that includes LAN printers installed in airports, subway stations, Internet cafeterias, and department stores. Users who desire access to the printers are assigned an authentication key. During this process, the printer manager or a manager program extracts the MAC address of the printing client, and the MAC address is provided to the wireless LAN printer to initiate a connection timer that corresponds to the printing client. The MAC address is also used to manage the link level of the printer, to request charges to the client, to forcibly stop a printing operation, and to prevent appropriation of a wired equivalent privacy (WEP) key used in a security protocol.

In addition, a log record describing usage of the printer can be stored using the MAC hierarchy. Here, the record is stored in a storage device of the printer or a storage device of the printer management server. Since the MAC addresses are unique, the printer manager can also collect user information by recording a user's device information, and storing marketing information such as the frequency of use associated with a particular printer.

As described above, by preventing association of non-authenticated printing clients with the wireless LAN printer, additional authenticated printing clients are given the opportunity to associate with the wireless LAN printer.

Furthermore, the print manager can provide distinct services by assigning a printing priority to the printing clients and request charges according to the functions of the wireless LAN printer used by the printing clients.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A printing client management method of a wireless Local Area Network printer that functions as a network server and manages at least one printing client in a Local Area Network, comprising:

extracting information from a Media Access Control frame of the at least one printing client that is associated with a Basic Service Set, which includes the wireless LAN printer as a master of the Basic Service Set, the extracted information being information specifying whether the at least one printing client is authenticated to receive services of the wireless LAN printer;

forming a list of the at least one printing client by using a Media Access Control address of the Media Access Control frame as an index, the list reflecting a state of the at least one printing client in relation to the wireless LAN printer;

managing printing operations of the at least one printing client according to the list by permitting only printing clients authenticated to receive services of the wireless LAN printer to associate with the wireless LAN printer, and monitoring the number and the traffic of the at least one printing client that is associated with the Basic Service Set, and rearranging the association of the at least one printing client to diffuse the traffic of the Basic Service Set, wherein the list of the at least one printing client is restructured in real time according to a beacon signal, and the list is updated when a state of the at least one printing client changes, wherein the at least one printing client is a personal computer, a personal digital assistant, or a cellular phone, that includes a wireless Local Area Network functionality, and wherein the Basic Service Set, including the wireless LAN printer as the master, further includes the only printing clients authenticated to receive services of the wireless LAN printer to associate with the wireless LAN printer as other members of the Basic Service Set.

2. The method according to claim 1, wherein the wireless Local Area Network printer and the at least one printing client operate within the IEEE 802.11b standard.

3. The method according to claim 1, wherein the list of the at least one printing client denotes state of the at least one printing client in relation to the wireless Local Area Network printer and includes fields for at least one of synchronization and association.

4. The method according to claim 1, wherein the list of the at least one printing client includes fields specifying whether each printing client is allowed to associate with the wireless Local Area Network printer.

5. The method according to claim 1, wherein the list of the at least one printing client includes fields assigning a printing priority to the at least one printing client.

6. The method according to claim 1, wherein the list of the at least one printing client includes fields denoting whether specific functions of the wireless Local Area Network printer are usable by the at least one printing client.

7. The method of according to claim 2, wherein the list of the at least one printing client is restructured in real time according to a beacon signal, and the list is updated when a state of the at least one printing client changes.

8. The method of according to claim 2, wherein the list of the at least one printing client denotes a state of the at least one printing client in relation to the wireless Local Area Network printer and includes fields for at least one of synchronization, association, and authentication.

9. The method of according to claim 2, wherein the list of the at least one printing client includes fields specifying whether the at least one printing client is allowed to associate with the wireless LAN Local Area Network printer.

10. The method of according to claim 2, wherein the list of the at least one printing client includes fields assigning a printing priority to the at least one printing client.

11. The method of according to claim 2, wherein the list of the at least one printing client includes fields denoting whether specific functions of the wireless Local Area Network printer are usable by the at least one printing client.

12. A wireless Local Area Network printer that functions as a network server and manages at least one printing client in a Local Area Network, comprising:

an extraction unit to extract information from a Media Access Control frame of the at least one printing client that is associated with a Basic Service Set, which includes the wireless LAN printer as a master of the Basic Service Set, the extracted information being information specifying whether the at least one printing client is authenticated to receive services of the wireless LAN printer;

a list forming unit to form a list of the at least one printing client using a Media Access Control address of the Media Access Control frame as an index, the list reflecting a state of the at least one printing client in relation to the wireless LAN printer; and a management unit to manage printing operations of the at least one printing client according to the list by permitting only printing clients authenticated to receive services of the wireless LAN printer to associate with the wireless LAN printer, wherein the list of the at least one printing client is restructured in real time according to a beacon signal, and the list is updated when a state of the at least one printing client changes, wherein the at least one printing client is a personal computer, a personal digital assistant, or a cellular phone, that includes a wireless Local Area Network functionality, wherein the Basic Service Set, including the wireless LAN printer as the master, further includes the only printing clients authenticated to receive services of the wireless LAN printer to associate with the wireless LAN printer as other members of the Basic Service Set, and wherein the wireless LAN printer is associated to the Basic Service Set through a printer management server, and the printer management server monitors the number and the traffic of the at least one printing client that is associated with the Basic Service Set, and arranges the association of the at least one printing client to diffuse the traffic of the Basic Service Set.

13. The wireless Local Area Network printer according to claim 12, wherein the wireless Local Area Network printer and the at least one printing client operate within the IEEE 802.11b standard.

14. The wireless Local Area Network printer according to claim 12, wherein the list denotes a state of the at least one printing client in relation to the wireless Local Area Network printer and includes fields for at least one of synchronization and association.

15. The wireless Local Area Network printer according to claim 12, wherein the list of the at least one printing client includes fields specifying whether each printing client is allowed to associate with the wireless Local Area Network printer.

16. The wireless Local Area Network printer according to claim 12, wherein the list of the at least one printing client includes fields assigning a printing priority to the at least one printing client.

17. The wireless Local Area Network printer according to claim 12, wherein the list of the at least one printing client includes fields denoting whether specific functions of the wireless Local Area Network printer are usable by the at least one printing client.

18. The wireless Local Area Network printer according to claim 12, wherein the extraction unit, the list forming unit, and the management unit are implemented in network cards of the wireless Local Area Network printer.

19. The wireless Local Area Network printer according to claim 12, wherein the extraction unit, the list forming unit, and the management unit are implemented as hardware or software.

20. The wireless LAN Local Area Network printer of according to claim 13, wherein the list of the at least one printing client is restructured in real time according to a beacon signal, and the list is updated when a state of the at least one printing client changes.

21. The wireless LAN Local Area Network printer of according to claim 13, wherein the list denotes a state of the at least one printing client with respect to the wireless LAN Local Area Network printer and includes fields for at least one of synchronization, association, and authentication.

22. The wireless LAN Local Area Network printer of according to claim 13, wherein the list of the at least one printing client includes fields specifying whether the at least one printing client is allowed to associate with the wireless Local Area Network printer.

23. The wireless LAN Local Area Network printer of according to claim 13, wherein the list of the at least one printing client includes fields assigning a printing priority to the at least one printing client.

24. The wireless LAN Local Area Network printer of according to claim 13, wherein the list of the at least one printing client includes fields denoting whether specific functions of the wireless Local Area Network printer are usable by the at least one printing client.

25. The wireless Local Area Network printer according to claim 13, wherein the extraction unit, the list forming unit, and the management unit are implemented in network cards of the wireless Local Area Network printer.

26. The wireless Local Area Network printer according to claim 13, wherein the extraction unit, the list forming unit, and the management unit are implemented as hardware or software.

27. The wireless Local Area Network printer according to claim 12, further comprising:
an association forming unit to associate each authenticated printing client with the wireless Local Area Network printer using the list of the at least one printing client.

28. The wireless Local Area Network printer according to claim 12, further comprising:
a media access control software is used to extract information from the Media Access Control frame of the at least one printing client; and
an application programming interface is used to form a list of the at least one printing client using Media Access Control address associated with the Media Access Control frame as an index.

29. The wireless Local Area Network printer according to claim 12, wherein the printer maintains a wired or wireless connection to a printer management server.

30. The wireless Local Area Network printer according to claim 29, wherein the printer management server includes a wireless Local Area Network printer remote management program.

31. The printer according to claim 17, wherein each field denoting whether specific functions of the wireless Local Area Network printer is enabled or disabled according to functions desired by a user.

32. A printing client management method of a wireless Local Area Network (LAN) printer, comprising:
forming a list that includes at least one printing client using a Media Access Control address of the Media Access Control frame related to the at least one printing client as an index, the list reflecting whether the at least one printing client is authenticated to receive services of the wireless LAN printer which is included as master of a Basic Server Set;
associating only printing clients authenticated to receive services of the wireless LAN printer with the wireless LAN printer using the list of the at least one printing client, and
monitoring the number and the traffic of the at least one printing client that is associated with the Basic Service Set, and rearranging the association of the at least one printing client to diffuse the traffic of the Basic Service Set,
wherein the list of the at least one printing client is restructured in real time according to a beacon signal, and the list is updated when a state of the at least one printing client changes,
wherein the at least one printing client is a personal computer, a personal digital assistant, or a cellular phone, that includes a wireless Local Area Network functionality, and
wherein the Basic Service Set further included the only printing clients authenticated to receive services of the wireless LAN printer to associate with the wireless LAN printer as other members of the Basic Service Set.

33. The method according to claim 32, wherein allowance of association of the at least one printing client in relation to the wireless Local Area Network printer is determined based on fields denoting association permission.

* * * * *